United States Patent
Kaplan

(10) Patent No.: US 7,477,829 B2
(45) Date of Patent: Jan. 13, 2009

(54) SLACK CABLE STORAGE BOX

(75) Inventor: Steven E. Kaplan, Elyria, OH (US)

(73) Assignee: Multilink, Inc., Elyria, OH (US)

( * ) Notice: Subject to any disclaimer, the term of this patent is extended or adjusted under 35 U.S.C. 154(b) by 0 days.

(21) Appl. No.: 11/412,561

(22) Filed: Apr. 27, 2006

(65) Prior Publication Data

US 2007/0274659 A1    Nov. 29, 2007

(51) Int. Cl.
*G02B 6/00*    (2006.01)
(52) U.S. Cl. ..................................... 385/147; 385/134
(58) Field of Classification Search ................. 385/147, 385/134

See application file for complete search history.

(56) References Cited

U.S. PATENT DOCUMENTS

| | | | | |
|---|---|---|---|---|
| 5,947,765 | A * | 9/1999 | Carlson et al. | 439/535 |
| 2005/0145522 | A1* | 7/2005 | Bloodworth et al. | 206/409 |
| 2006/0217231 | A1* | 9/2006 | Parks et al. | 482/3 |
| 2006/0254817 | A1* | 11/2006 | Caveney | 174/481 |
| 2007/0086721 | A1* | 4/2007 | Dobbins et al. | 385/135 |

\* cited by examiner

*Primary Examiner*—Ellen Kim
(74) *Attorney, Agent, or Firm*—Renner, Otto, Boisselle & Sklar, LLP

(57) ABSTRACT

Slack cable storage box includes a base and a cover removably attachable to the base to provide an enclosure for a slack cable storage spool that may be part of the cover or removably attached to the base. The outer end face of the cover may be recessed for receipt of one or more interchangeable decorative faceplates.

14 Claims, 4 Drawing Sheets

SLACK CABLE STORAGE BOX

FIELD OF THE INVENTION

This invention relates to a slack cable storage box used to store slack cable adjacent multiple dwelling units of an apartment or condominium building or the like to facilitate running network or broadband cable service to the units upon request.

BACKGROUND OF THE INVENTION

Whenever a network or broadband cable service provider is called upon to provide broadband service to some but not all of the units of a multiple dwelling unit such as an apartment or condominium building or the like, it would be advantageous to bring enough cable into the building at the same time to be able to run broadband service to virtually any of the units in the building if requested to do so later on, not just those requesting broadband service at that time. The problem is where and how to store the slack cable needed to provide broadband service to those units that haven't as yet requested it.

SUMMARY OF THE INVENTION

The present invention addresses the foregoing problems by providing slack cable storage boxes that can easily be mounted on the corridor walls outside those units of a multiple dwelling unit that have not as yet requested broadband service and run individual lengths of cable from a main multiple dwelling unit box installed on the outside of the building or in a closet or stairwell of the building or the like to each of the slack storage boxes for storing enough slack cable in each box to be able to provide broadband service to each unit if requested to do so later on.

In accordance with one aspect of the invention, each slack cable storage box includes a base having a back wall attachable to a wall structure of the multiple dwelling unit, a cover removably attachable to the base to provide an enclosure, and a slack storage spool for storing a length of cable within the enclosure for possible use later on.

In accordance with another aspect of the invention, the base back wall may have a relatively large opening through which a portion of the wall structure is accessible for punching or otherwise making a hole at least partway through the wall structure when the cover and spool are removed from the base so that the amount of cable needed to run broadband service to a unit can be uncoiled from the slack storage spool and fed into the unit through the hole.

In accordance with another aspect of the invention, the spool may be attached to the cover or removably attachable to the base to permit the spool to be removed from the base with the cover removed for ease of wrapping the slack cable around the spool and/or punching a hole in the wall structure through the opening in the base back wall and uncoiling sufficient cable from the spool to wire the unit and feeding the cable through the hole into the unit.

In accordance with another aspect of the invention, the spool may have an open center that at least partially overlies the opening in the base back wall when the spool is attached to the base to permit the uncoiled slack cable to be fed through the spool open center and the opening in the base back wall into the hole in the building wall structure without damaging the cable.

In accordance with another aspect of the invention, a docking station may be provided at one end of the spool for docking a connector attached to a free end of the slack cable when wrapped around the spool.

In accordance with another aspect of the invention, the outer end face of the cover may have a recess for receipt of a decorative faceplate.

In accordance with another aspect of the invention, any number of differently decorated faceplates may be interchangeably snap fitted into the recess.

These and other objects, advantages, features and aspects of the present invention will become apparent as the following description proceeds.

To the accomplishment of the foregoing and related ends, the invention, then, comprises the features hereinafter more fully described and particularly pointed out in the claims, the following description and the annexed drawings setting forth in detail certain illustrative embodiments of the invention, these being indicative, however, of but several of the various ways in which the principles of the invention may be employed.

DETAILED DESCRIPTION OF THE INVENTION

Figure 1:
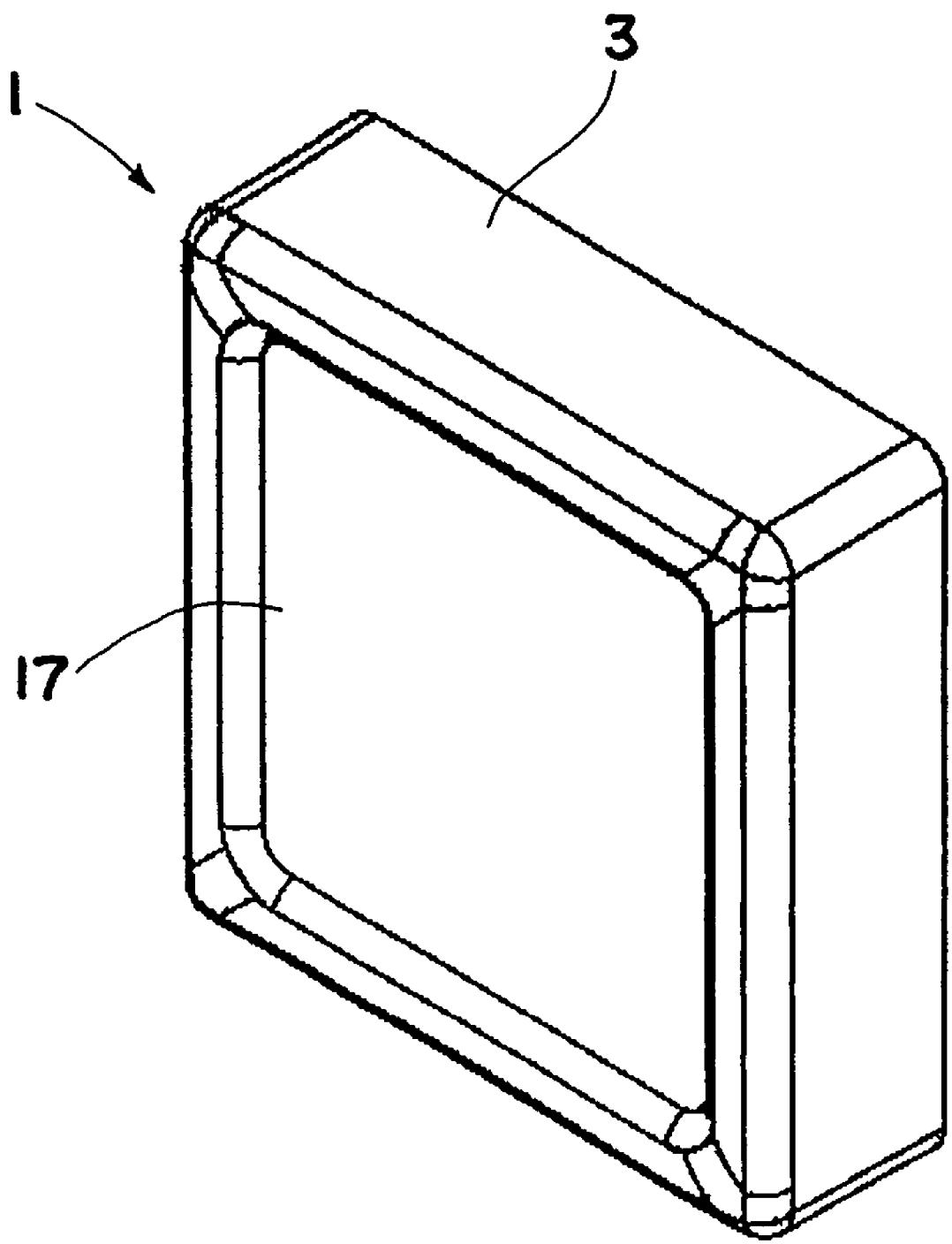
FIG. 1 is a perspective view of one form of slack cable storage box of the present invention.

Referring now more particularly to the drawings, wherein like reference numerals are used to designate like parts, and initially to FIGS. 1-4, there is shown one form of slack cable storage box 1 of the present invention including a base 2 and a cover 3 removably attachable to the base to provide an accessible enclosure for a slack cable storage spool 5 for storing a length of cable within the enclosure. Such slack cable storage boxes may be mounted on corridor walls adjacent any number of multiple dwelling units in an apartment or condominium building or the like to provide enough slack cable to run network or broadband cable service to any of the units upon request.

Base 2 may be secured to the corridor wall of such multiple dwelling units as by inserting suitable fasteners such as screws or nails or the like through slots 6 in the back wall 7 of the base (see FIGS. 2 and 4) for anchoring into the wall structure. Alternatively, adhesive or other suitable means may be used to secure the base to the wall structure.

Cover 3 may be removably attached to base 2 in any convenient manner, for example, by providing one or more axially outwardly extending attachment posts 8 on the base back wall 7 containing threaded bores 9 for threaded receipt of fasteners extending through fastener openings 10 in the cover end face 11. These fastener openings 10 may be located within a recess 15 in the outer surface 16 of the cover end face 11 for concealment by a decorative faceplate 17 that may be snap fitted into slots 18 in the sides of the recess (see FIG. 2). If desired, any number of differently decorated faceplates may be interchangeably receivable within the recess to give the box a different appearance or motif. Likewise, the boxes and/or faceplates may be made in different colors, sizes and shapes as desired.

Figure 2:
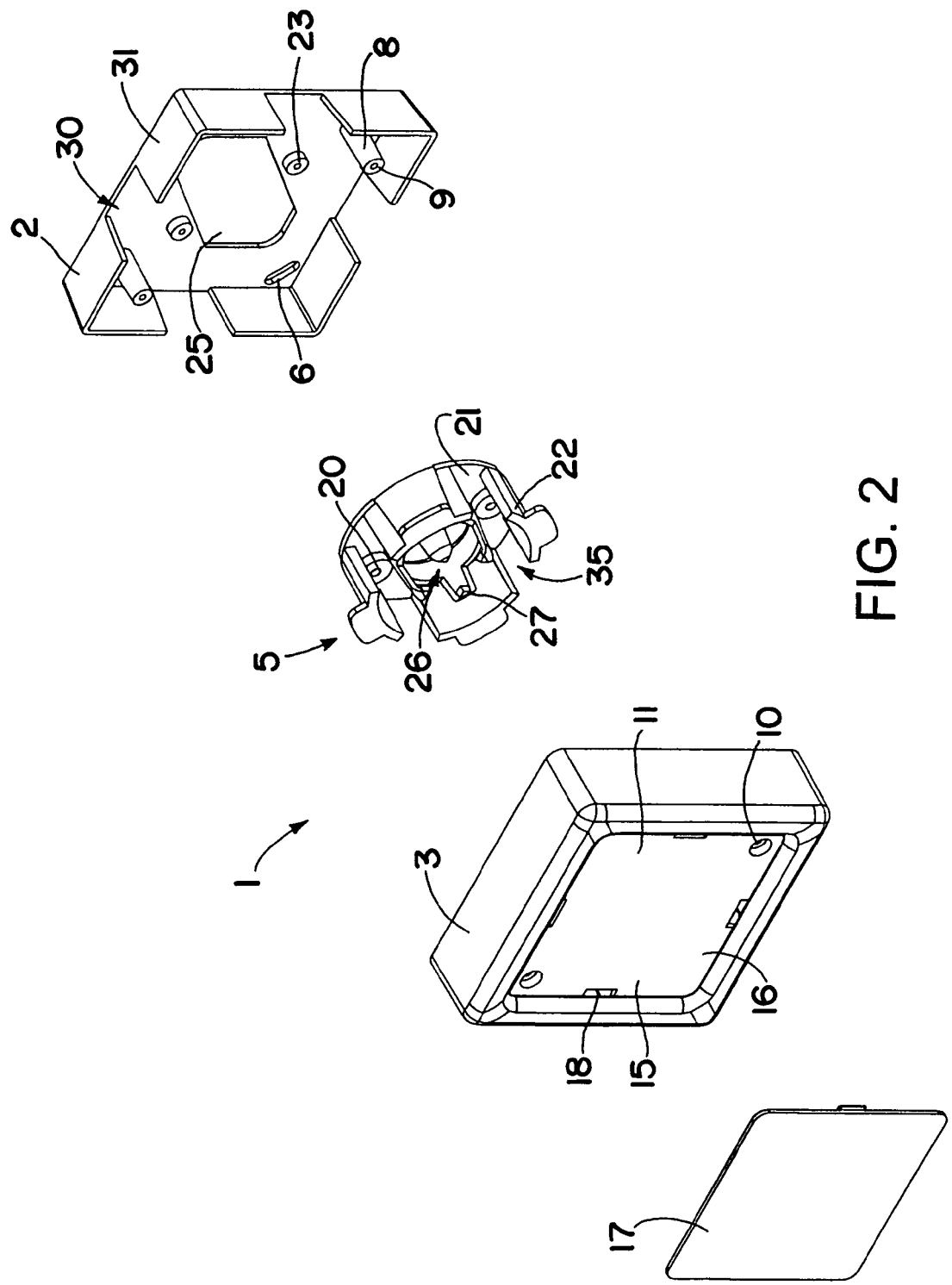
FIG. 2 is an exploded perspective view of the slack cable storage box of FIG. 1.
Figure 3:
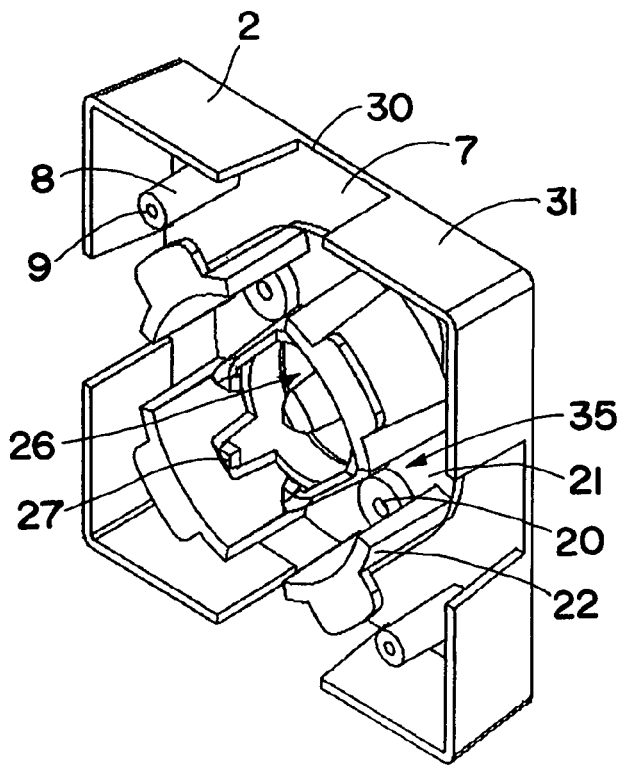
FIG. 3 is an enlarged perspective view of the base of the box of FIG. 1 showing the slack cable storage spool attached to the base.
Figure 4:
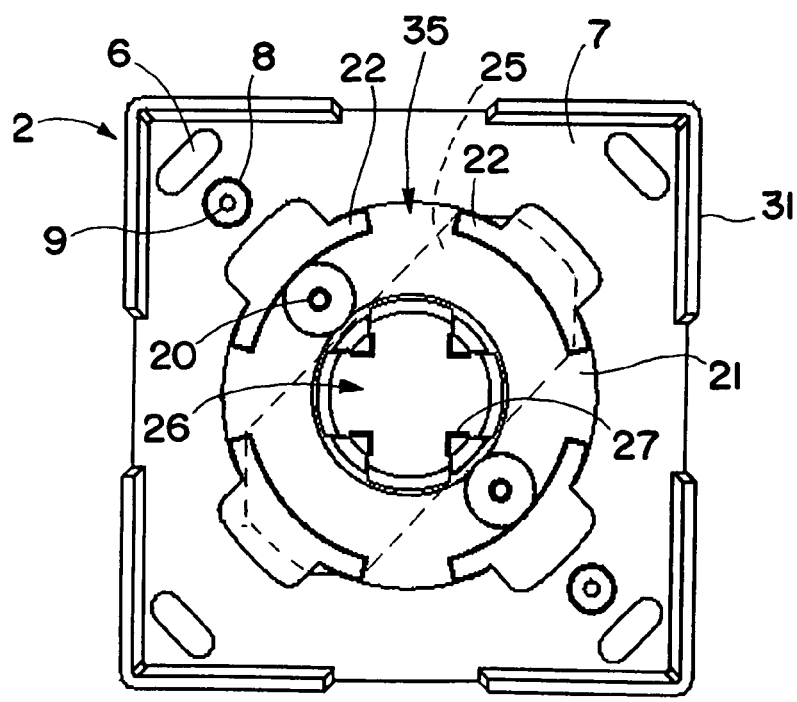
FIG. 4 is a front elevation view of the base of FIG. 3 with the slack cable storage spool attached to the base.
Figure 5:
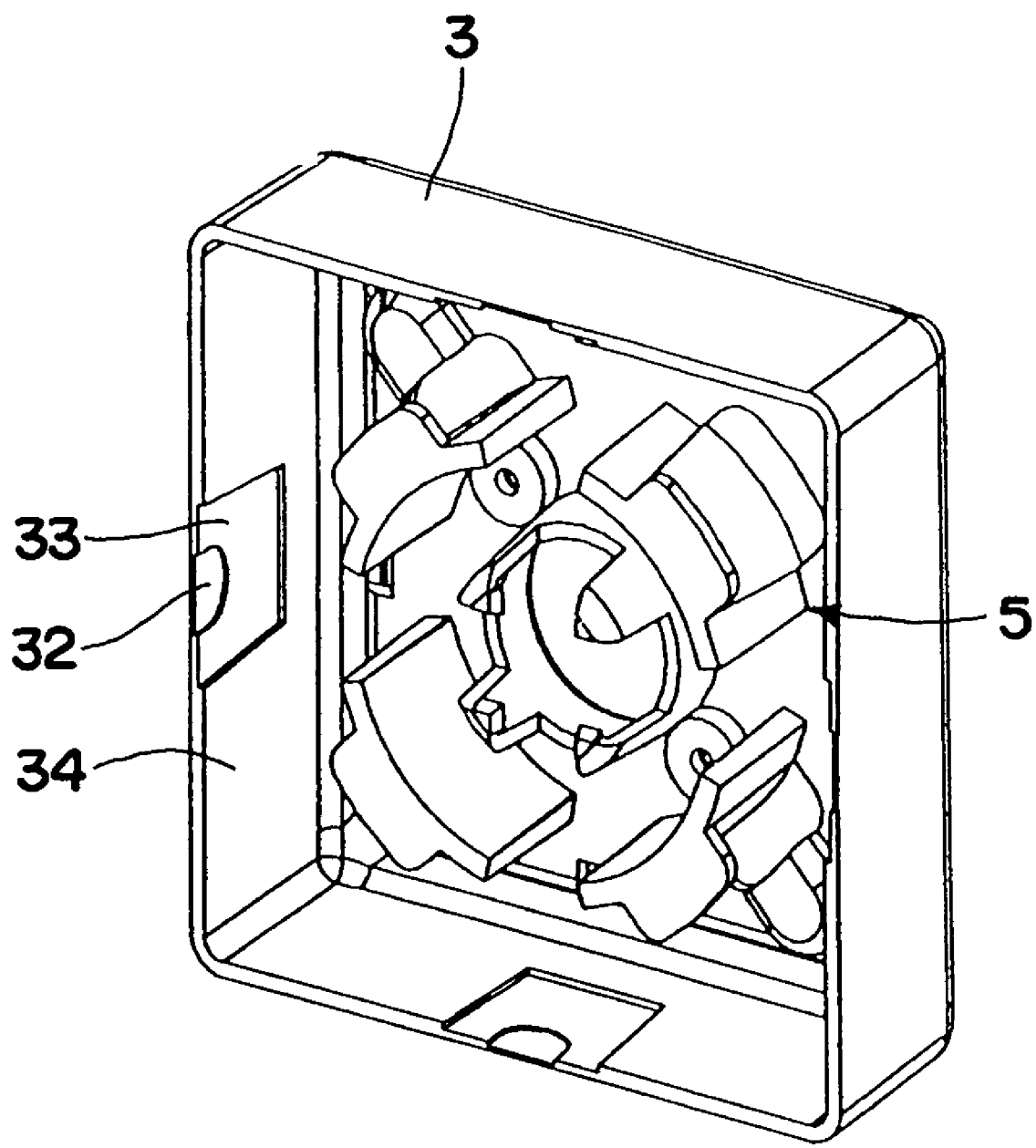
FIG. 5 is an enlarged perspective view of another cover for the box showing an alternate arrangement in which the slack cable storage spool is part of the cover instead of being removably attachable to the base.

The slack cable storage spool 5 is shown in FIGS. 2-4 removably attachable to the base as by inserting fasteners (not shown) through circumferentially spaced holes 20 in the spool hub 21 radially inwardly of the arcuate spool segments 22 for threaded engagement in threaded bores 23 in the base back wall 7. Alternatively, the spool 5 may be secured within the cover 3 as shown in FIG. 5. However, an advantage in removably attaching the spool to the base instead of inside the cover is that the installer can then more easily make certain that the slack cable is properly stored on the spool within the base before the cover is attached to the base to eliminate any chance of pinching the cable during such cover attachment.

Making the spool 5 detachable from the base also has the advantage that the slack cable can be more easily wrapped around the spool while the spool is removed from the base. Moreover, the spool may be removed from the base in order to facilitate punching or otherwise forming a hole at least partway through the wall structure of the unit through a relatively large opening 25 in the base back wall 7 preparatory to feeding the cable through the hole into the unit.

The size of each slack cable storage box 1 may be varied depending on the amount of slack cable that is required to be stored in each box. The arcuate spool segments 22 inside the box maintain a minimum bend radius of the cable to prevent breakage which for example in the case of optical fiber is on the order of ten times the fiber diameter.

The spool 5 has an axial open center 26 that at least partially overlies the enlarged opening 25 in the base back wall 7 when the spool is attached to the base as shown in FIG. 4 to permit the leading end of the slack cable (not shown) to be fed through the spool open center and the center opening in the base back wall into a hole when made in the building wall structure. As FIG. 4 clearly shows, the size of the axial open center 26 of the spool 5 is less than half the size of the enlarged center opening 25 in the base back wall 7. A plurality of circumferentially spaced docking station brackets 27 may extend axially outwardly from the inner diameter of the spool hub 21 for docking a suitable connector (not shown) attached to the free end of the slack cable while the slack cable is stored within the box.

Individual continuous lengths of cable may be run from a main multiple dwelling unit box located for example on the outside of the building or in a closet or stairwell or other convenient location in the building, to each of the slack cable storage boxes 1 through suitable raceways or moldings attachable to the building wall structure, with sufficient slack cable being provided for wrapping around the spool in each box to be able to run network or broadband cable service into each unit if requested. Suitable slots or openings 30 may be provided in one or more side walls 31 of the base back wall 7 (see FIGS. 2-4) for entry of the cable and associated raceway or molding into the box. Also different size knockouts 32, 33 may be provided in one or more of the cover side walls 34 (see FIG. 5) that may be selectively removed for accommodating different size raceways or moldings when the cover is attached to the base.

To provide cable service to a particular multiple dwelling unit, the cover 3 and spool 5 of the associated slack cable storage box 1 are removed from the base 2 for ease of punching or otherwise forming a hole through the portion of the wall structure of the unit that is accessible through the enlarged opening 25 in the base back wall 7. Then the connector on the free end of the cable (not shown) is removed from the docking station brackets 27 and the desired amount of cable needed is uncoiled from the spool and fished through the hole in the wall structure or dropped down inside the wall to a box in the unit where the broadband connection is to be made. Circumferentially spaced gaps 35 between the spool segments 22 provide for easy cable access to the open center 26 of the spool through any one of the gaps. If all of the slack cable is used to make the broadband connection within the unit, the spool may be discarded rather than reattached to the base before reattaching the cover to the base if desired.

Although the invention has been shown and described with respect to certain embodiments, it is obvious that equivalent alterations and modifications will occur to others skilled in the art upon the reading and understanding of the specification. In particular, with regard to the various functions performed by the above-described components, the terms (including any reference to a "means") used to describe such components are intended to correspond, unless otherwise indicated, to any component which performs the specified function of the described component (e.g., that is functionally equivalent), even though not structurally equivalent to the disclosed component which performs the function of the herein illustrated exemplary embodiment of the invention. In addition, while a particular feature of the invention may have been disclosed with respect to only one embodiment, such feature may be combined with one or more other features as may be desired and advantageous for any given or particular application.

What is claimed is:

1. A slack cable storage box comprising a base having a back wall attachable to a wall structure of a multiple dwelling unit, a cover removably attachable to the base to provide an enclosure, and a slack cable storage spool for storing a length of cable within the enclosure when wrapped around the spool, the base back wall having a relatively large center opening through which a portion of the wall structure is accessible for making a hole at least partway through the wall structure when the cover and spool are removed from the base, wherein the spool has an axial open center that is of a size less than half the size of the center opening in the back wall and overlies a portion of the center opening in the base back wall when the spool is within the enclosure to permit a leading end of the slack cable to be fed coaxially through the axial open center of the spool and the center opening in the base back wall into a hole when made in the building wall structure.

2. The box of claim 1 wherein the spool includes a plurality of spool segments with circumferentially spaced gaps between the spool segments that provide cable access to the axial open center of the spool through the gaps.

3. The box of claim 1 wherein the spool is removably attachable to the base back wall, and the base back wall has a plurality of axially outwardly extending cover attachment posts located radially outwardly of the spool when attached to the base back wall, the cover attachment posts containing threaded bores for threaded receipt of fasteners extending through fastener openings in an end face of the cover.

4. The box of claim 3 wherein an outer surface of the cover end face has a recess for receipt of a decorative faceplate.

5. The box of claim 4 wherein the fastener openings intersect a bottom wall of the recess in the cover end face and are concealed by the faceplate when received within the recess.

6. The box of claim 5 wherein the faceplate has a snap fit in the recess.

7. The box of claim 5 wherein different decorative faceplates are interchangeably receivable within the recess.

8. The box of claim 1 further comprising docking station means at an outer end of the spool for docking a connector attached to a free end of the slack cable when wrapped around the spool.

9. The box of claim 1 wherein the base back wall has slots radially outwardly of the center opening in the base back wall for receiving fasteners for attaching the base to the building wall structure.

10. The box of claim 1 wherein the base back wall has side walls over which cover side walls extend when the cover is attached to the base, and wherein at least one of the base side walls has a slot or opening for receiving an end of a raceway attachable to the building wall structure for supplying the length of cable to the unit.

11. The box of claim 10 wherein one or more of the cover side walls has a knockout that is selectively removable to accommodate the raceway that is receivable in the slot in one of the base side walls.

12. The box of claim 11 wherein at least the one cover side wall includes different size knockouts that are selectively removable for accommodating different size raceways.

13. A slack cable storage box comprising a base having a back wall attachable to a wall structure, a cover removably attachable to the base to form an enclosure, and a slack storage spool for storing a length of cable within the enclosure when wrapped around the spool, the cover having an outer end face that has a recess for receipt of different decorative faceplates that are interchangeably snap fittable into the recess, wherein the base back wall has a plurality of axially outwardly extending cover attachment posts located radially outwardly of the spool when located within the enclosure, the cover attachment posts containing threaded bores for threaded receipt of fasteners extending through fastener openings extending into a bottom wall of the recess in the cover end face that are concealed by the faceplate when received within the recess.

14. A slack cable storage box comprising a base having a back wall attachable to a wall structure, a cover removably attachable to the base to form an enclosure, and a slack storage spool for storing a length of cable within the enclosure when wrapped around the spool, the cover having an outer end face that has a recess for receipt of different decorative faceplates that are interchangeably snap fittable into the recess, further comprising docking station means at an outer end of the spool for docking a connector attached to a free end of the slack cable when wrapped around the spool.

\* \* \* \* \*